US011954921B2

(12) United States Patent
Zhu et al.

(10) Patent No.: US 11,954,921 B2
(45) Date of Patent: Apr. 9, 2024

(54) SYSTEM AND METHOD FOR IMPROVING DRIVER SITUATION AWARENESS PREDICTION USING HUMAN VISUAL SENSORY AND MEMORY MECHANISM

(71) Applicant: Honda Motor Co., Ltd., Tokyo (JP)

(72) Inventors: Haibei Zhu, Woburn, MA (US); Teruhisa Misu, Mountain View, CA (US); Sujitha Catherine Martin, San Jose, CA (US); Xingwei Wu, Sunnyvale, CA (US); Kumar Akash, Milpitas, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 17/324,453

(22) Filed: May 19, 2021

(65) Prior Publication Data
US 2022/0277165 A1 Sep. 1, 2022

Related U.S. Application Data

(60) Provisional application No. 63/154,051, filed on Feb. 26, 2021.

(51) Int. Cl.
G06V 20/59 (2022.01)
B60Q 9/00 (2006.01)
(Continued)

(52) U.S. Cl.
CPC ........ *G06V 20/597* (2022.01); *B60R 16/0231* (2013.01); *G06F 18/24* (2023.01);
(Continued)

(58) Field of Classification Search
CPC .... G06V 20/597; G06V 10/462; G06V 20/56; G06K 9/6267; G06K 9/6289
See application file for complete search history.

(56) References Cited

U.S. PATENT DOCUMENTS 11,269,420 B1\* 3/2022 Marti ...................... G06V 20/58
2009/0303078 A1\* 12/2009 Mochizuki ............. G08G 1/166
340/901

(Continued)

OTHER PUBLICATIONS

W. G. Chase and H. A. Simon, "Perception in chess," Cognitive Psychology, vol. 4, No. 1, pp. 55-81, 1973.
(Continued)

*Primary Examiner* — David Perlman
(74) *Attorney, Agent, or Firm* — RANKIN, HILL & CLARK LLP

(57) ABSTRACT

A system and method for improving driver situation awareness prediction using human visual sensory and memory mechanism that includes receiving data associated with a driving scene of a vehicle and an eye gaze of a driver of the vehicle. The system and method also include analyzing the data and extracting features associated with objects located within the driving scene and determining a situational awareness score that is associated with a situational awareness of the driver with respect to each of the objects located within the driving scene. The system and method further include communicating control signals to electronically control at least one system of the vehicle based on the situational awareness score that is associated with each of the objects located within the driving scene.

18 Claims, 6 Drawing Sheets

(51) Int. Cl.
  B60R 16/023    (2006.01)
  B60W 40/09     (2012.01)
  G05D 1/02      (2020.01)
  G06F 18/24     (2023.01)
  G06F 18/25     (2023.01)
  G06V 10/46     (2022.01)
  G06V 20/56     (2022.01)
  G08G 1/0962    (2006.01)
  G05D 1/00      (2006.01)

(52) U.S. Cl.
  CPC .......... *G06F 18/251* (2023.01); *G06V 10/462* (2022.01); *G06V 20/56* (2022.01); *B60Q 9/00* (2013.01); *B60W 40/09* (2013.01); *B60W 2540/225* (2020.02); *G05D 1/0231* (2013.01); *G08G 1/0962* (2013.01)

(56) References Cited

U.S. PATENT DOCUMENTS

| | | | | |
|---|---|---|---|---|
| 2016/0117947 | A1* | 4/2016 | Misu | B60W 50/085 434/62 |
| 2016/0171322 | A1* | 6/2016 | Gunaratne | A61B 5/163 348/148 |
| 2018/0086339 | A1* | 3/2018 | Hanna | B60W 30/09 |
| 2021/0061287 | A1* | 3/2021 | Cieslar | B60W 60/0053 |

OTHER PUBLICATIONS

M.R. Endsley, Designing for Situation Awareness: An Approach to User-Centered Design. CRC Press, 2016.
H. Kim and J. L. Gabbard, "Assessing distraction potential of augmented reality head-up displays for vehicle drivers," Human Factors, May 2019.
S. Martin and A. Tawari, "Object of fixation estimation by joint analysis of gaze and object dynamics," in 2018 IEEE Intelligent Vehicles Symposium (IV). IEEE, 2018, pp. 2042-2047.
J. Nelson, "Motion sensitivity in peripheral vision." Perception, vol. 3, No. 2, pp. 151-152, 1974.
D. Topolsek, I. Areh, and T. Cvahte, "Examination of driver detection of roadside traffic signs and advertisements using eye tracking," Transportation Research Part F: Traffic Psychology and Behaviour, vol. 43, pp. 212-224, 2016.
R. C. Atkinson and R. M. Shiffrin, "Human memory: A proposed system and its control processes," Psychology of Learning and Motivation, vol. 2, No. 4, pp. 89-195, 1968.
F. T. Durso, C. A. Hackworth, T. R. Truitt, J. Crutchfield, D. Nikolic, and C. A. Manning, "Situation awareness as a predictor of performance for en route air traffic controllers," Air Traffic Control Quarterly, vol. 6, No. 1, pp. 1-20, 1998.
M. R. Endsley, "Design and evaluation for situation awareness enhancement," in Proceedings of the Human Factors Society Annual Meeting, vol. 32, No. 2. Los Angeles, CA: Sage Publications, 1988, pp. 97-101.
M.R. Endsley, "Measurement of situation awareness in dynamic systems," Human Factors, vol. 37, No. 1, pp. 65-84, 1995.
M.R. Endsely, "Direct measurement of situation awareness: Validity and use of SAGAT," Situation Awareness Analysis and Measurement, vol. 10, pp. 147-173, 2000.
M.R. Endsley, "Toward a theory of situation awareness in dynamic systems," Human Factors, vol. 37, No. 1, pp. 32-64. 1995.
L. Gugerty et al., "Situation awareness in driving," Handbook for Driving Simulation in Engineering, Medicine and Psychology, vol. 1, pp. 265-272, 2011.
M. Iwasaki and H. Inomata, "Relation between superficial capillaries and foveal structures in the human retina," Investigative Ophthalmology & Visual Science, vol. 27, No. 12, pp. 1698-1705, 1986.
M. A. Just and P. A. Carpenter, "A theory of reading: From eye fixations to comprehension," Psychological Review, vol. 37, No. 4, p. 329, 1980.
B. Kapitaniak, M. Walczak, M. Kosobudzki, Z. Jozwiak, and A. Bortkiewicz, "Application of eye-tracking in drivers testing: A review of research," International Journal of Occupational Medicine and Environmental Health, vol. 28, No. 6, p. 941, 2015.
H. Kim, S. Martin, A. Tawari, T. Misu, and J. L. Gabbard, "Toward real-time estimation of driver situation awareness: An eye-tracking approach based on moving objects of interest," in IEEE Intelligent Vehicles Symposium (IV). IEEE, 2020, pp. 1035-1041.
H. Kim, J. L. Gabbard, S. Martin, A. Tawari, and T. Misu, "Toward prediction of driver awareness of automotive hazards: Driving-video-based simulation approach," in Proceedings of the Human Factors and Ergonomics Society Annual Meeting, vol. 63, No. 1. Los Angeles, CA: Sage Publications, 2019, pp. 2099-2103.
S. Martin, S. Vora, K. Yuen, and M. M. Trivedi, "Dynamics of driver's gaze: Explorations in behavior modeling and maneuver prediction," IEEE Transactions on Intelligent Vehicles, vol. 3, No. 2, pp. 141-150, 2018.
G. A. Miller, "The magical number seven, plus or minus two: Some limits on our capacity for processing information." Psychological Review, vol. 63, No. 2, p. 81, 1956.
K. Moore and L. Gugerty, "Development of a novel measure of situation awareness: The case for eye movement analysis," in Proceedings of the Human Factors and Ergonomics Society Annual Meeting, vol. 54, No. 19. Los Angeles, CA: Sage Publications, 2010, pp. 1650-1654.
W. W. Nelson and G. R. Loftus, "The functional visual field during picture viewing." Journal of Experimental Psychology: Human Learning and Memory, vol. 6, No. 4, p. 391, 1980.
T. Nguyen, C. P. Lim, N. D. Nguyen, L. Gordon-Brown, and S. Nahavandi, "A review of situation awareness assessment approaches in aviation environments," IEEE Systems Journal, vol. 13, No. 3, pp. 3590-3603, 2019.
N. Quinn, L. Csincsik, E. Flynn, C. A. Curcio, S. Kiss, S. R. Sadda, R. Hogg, T. Peto, and I. Lengyel, "The clinical relevance of visualising the peripheral retina," Progress in Retinal and Eye Research, vol. 68, pp. 83-109, 2019.
K. Rayner and M. Castelhano, "Eye movements," Scholarpedia, vol. 2, No. 10, p. 3649, 2007.
C. Vondrick, D. Patterson, and D. Ramanan, "Efficiently scaling up crowdsourced video annotation," International Journal of Computer Vision, vol. 101, No. 1, pp. 184-204, 2013.
H. Zhu, K.-V. Yuen, L. Mihaylova, and H. Leung, "Overview of environment perception for intelligent vehicles," IEEE Transactions on Intelligent Transportation Systems, vol. 18, No. 10, pp. 2584-2601, 2017.
Insurance Institute for Highway Safety (IIHS), "Insurance institute for highway safety status report," IIHS, Tech. Rep. 51-1, 2016.
National Highway Safety Transportation Administration (NHSTA), "Large-scale field test of forward collision alert and lane departure warning systems," NHSTA, Tech. Rep., 2016.
National Highway Safety Transportation Administration (NHSTA), "Crash factors in intersection-related crashes: An on- scene perspective," NHSTA, Tech. Rep., 2016.

* cited by examiner

SYSTEM AND METHOD FOR IMPROVING DRIVER SITUATION AWARENESS PREDICTION USING HUMAN VISUAL SENSORY AND MEMORY MECHANISM

CROSS-REFERENCE TO RELATED APPLICATION

This application claims priority to U.S. Provisional Application Ser. No. 63/154,051 filed on Feb. 26, 2021, which is expressly incorporated herein by reference.

BACKGROUND

With improvements in sensing technologies, recent intelligent vehicles have been equipped with advanced driver assistance systems (ADASs) as standard features. For example, in the United States, forward collision waring systems will be standardized to passenger vehicles within a few years. While warnings provided by such systems have proven to enhance driving operations, reports show that some users turn off these functions. A major reason for this behavior is that those warnings are generated only based on surrounding traffic conditions and driver's steering and pedal operations but are oblivious to driver's perceptions and decisions. This results in making these warnings redundant as such systems warn the driver even when the driver is already aware of the dangers. This may lead to the driver inherently ignoring warnings that may be pertinent.

BRIEF DESCRIPTION

According to one aspect, a computer-implemented method for improving driver situation awareness prediction using human visual sensory and memory mechanism that includes receiving data associated with a driving scene of a vehicle and an eye gaze of a driver of the vehicle. The computer-implemented method also includes analyzing the data and extracting features associated with objects located within the driving scene and determining a situational awareness score that is associated with a situational awareness of the driver with respect to each of the objects located within the driving scene. The computer-implemented method further includes communicating control signals to electronically control at least one system of the vehicle based on the situational awareness score that is associated with each of the objects located within the driving scene.

According to another aspect, a system for improving driver situation awareness prediction using human visual sensory and memory mechanism that includes a memory storing instructions when executed by a processor cause the processor to receive data associated with a driving scene of a vehicle and an eye gaze of a driver of the vehicle. The instruction also causes the processor to analyze the data and extracting features associated with objects located within the driving scene and determine a situational awareness score that is associated with a situational awareness of the driver with respect to each of the objects located within the driving scene. The instructions further cause the processor to communicate control signals to electronically control at least one system of the vehicle based on the situational awareness score that is associated with each of the objects located within the driving scene.

According to yet another aspect, a non-transitory computer readable storage medium storing instructions that when executed by a computer, which includes a processor perform a method that includes receiving data associated with a driving scene of a vehicle and an eye gaze of a driver of the vehicle. The method also includes analyzing the data and extracting features associated with objects located within the driving scene and determining a situational awareness score that is associated with a situational awareness of the driver with respect to each of the objects located within the driving scene. The method further includes communicating control signals to electronically control at least one system of the vehicle based on the situational awareness score that is associated with each of the objects located within the driving scene.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
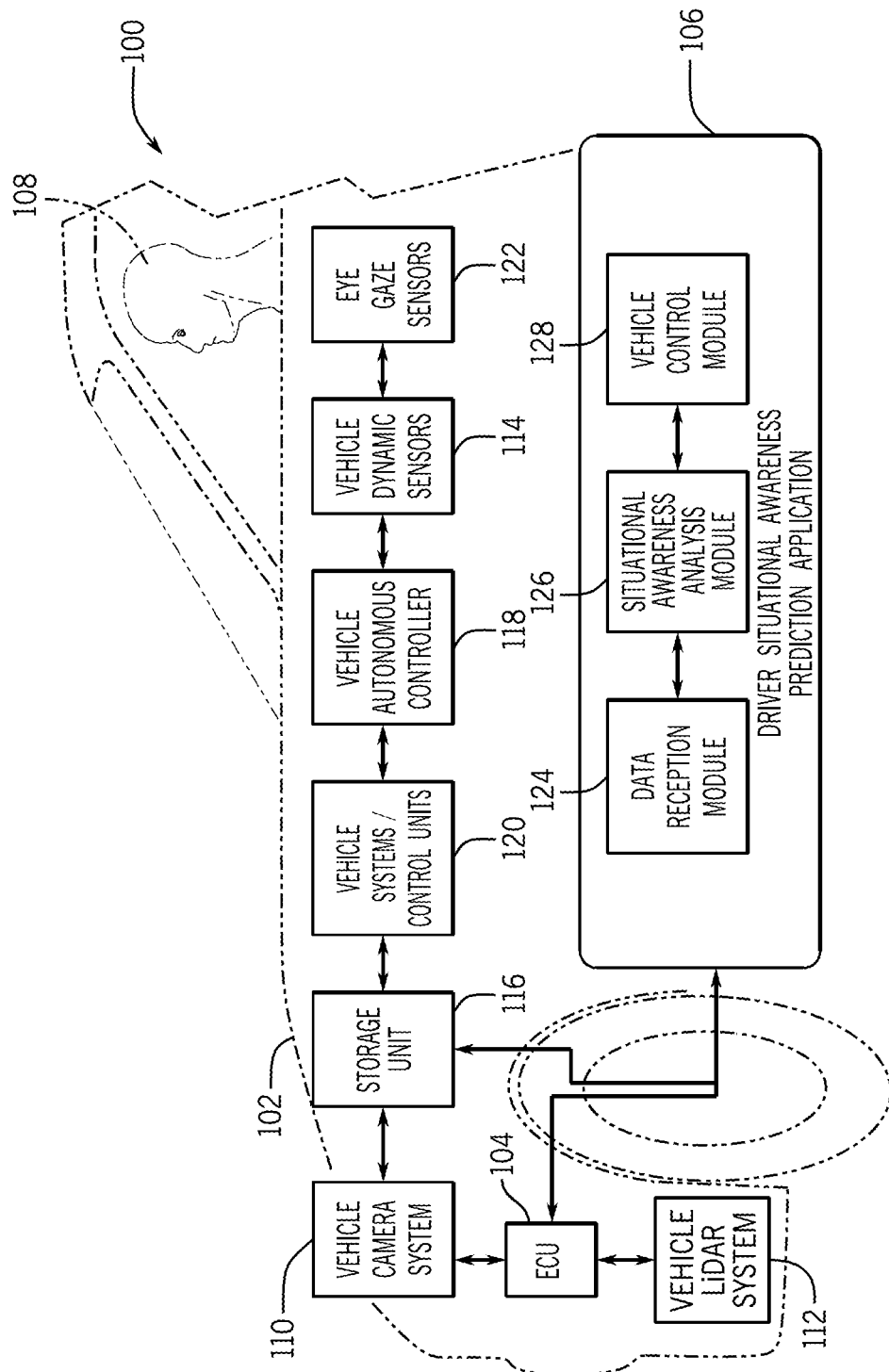
FIG. 1 is a schematic view of an exemplary system for improving driver situation awareness prediction using human visual sensory and memory mechanism according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for improving driver situation awareness prediction using human visual sensory and memory mechanism according to an exemplary embodiment of the present disclosure. The components of the system 100, as well as the components of other systems, hardware architectures, and software architectures discussed herein, may be combined, omitted, or organized into different architectures for various embodiments.

Generally, the system includes a vehicle 102 that includes an electronic control unit (ECU) 104 that executes one or more applications, operating systems, vehicle system and subsystem user interfaces, among others. The ECU 104 may also execute a driver situational awareness prediction application (situational awareness application) 106 that may be configured to improve driver situation awareness to thereby enhance an operation of the vehicle 102 based on driver perception, driver understanding, and projection of objects' properties and positions to provide warnings and/or autonomous controls to account for objects that a driver 108 of the vehicle 102 may not aware of above a situational awareness threshold that pertains to a classification of each object and a position of each object that is located within the driving scene of the vehicle 102. The situational awareness application 106 is configured to input data associated with properties and characteristics of human visual sensory and memory mechanism. Such data may be analyzed to output situational awareness prediction that may be utilized to electronically control to the operation of the vehicle 102.

The system 100 is configured to improve driver situation awareness to thereby enhance an operation of a vehicle 102 based on driver perception, understanding, and projection of objects' properties and positions to provide warnings for objects that drivers are not aware of above the situational awareness threshold. Accordingly, the present disclosure describes a system and method that allows an improvement to the technology regarding vehicle driver assistance systems and vehicle autonomous driving systems with respect to predicting a vehicle driver's situational awareness of dynamic objects and static objects that are included within a driving scene of the vehicle 102. This functionality thereby enhances the operation of the vehicle 102 based on driver perception of objects that are located within the driving scene of the vehicle 102, driver understanding of the objects that are located within the driving scene of the vehicle 102, and the properties and positions of objects that are located within the driving scene of the vehicle 102.

The situational awareness application 106 is configured to input data associated with properties and characteristics of human visual sensory and memory mechanism. The situational awareness application 106 is further configured to provide a predictive model for drivers' situational awareness which utilizes object properties that are based on object classifications. As the vehicle 102 is driven in a driving scene of the vehicle 102 which may include roadways, intersections, sidewalks, dynamic objects (e.g., pedestrians, other vehicles, etc.), static objects (e.g., traffic posts, traffic lights, buildings, trees, guardrails, etc.), data may be captured regarding the driving scene of the vehicle 102. The application 106 may be configured to input and analyze such data with classifier data that pertains to human visual sensory and human memory mechanics to provide the predictive model for the drivers' situational awareness. This functionality may alleviate issues where warnings are provided to the driver 108 of the vehicle 102 for objects that the driver 108 may already be well aware of to avoid unnecessary and redundant vehicle alerts.

As discussed in more detail below, the situational awareness application 106 is configured to capture sensory data associated with the driver 108 of the vehicle 102 as the vehicle 102 is driven within the driving scene. The situational awareness application 106 is configured to receive various forms of sensor data, process and analyze the sensor data in the forms of driver eye gaze data associated with the eye gaze of the driver 108, image data associated with images of objects located within the driving scene of the vehicle 102, and LiDAR data associated with the LiDAR detection of objects located within the driving scene of the vehicle 102. As discussed below, the situational awareness application 106 is configured to combine object property information with driver gaze information to consider the characteristics of human visual sensory systems.

The situational awareness application 106 considers the driver's gaze behavior with respect to the awareness of objects that are located within the driving scene of the vehicle 102 using foveal and peripheral visions to predict the situational awareness of the driver 108 with respect to respective objects that are located within the driving scene of the vehicle 102. The situational awareness application 106 is configured to thereby assign situational awareness scores that pertain the driver's awareness and attentiveness to each dynamic object and each static object that is located within the driving scene of the vehicle 102.

The situational awareness scores may be based on a duration and/or proximity of one or more gaze points to respective objects. As such, a longer dwell time on a particular object and/or the closer gaze point to the particular object, the more likely the driver 108 is aware of the object's existence and position within the driving scene. The length of dwell time and/or the closeness of the gaze point (e.g., distance between the driver gaze point and the object) may thereby correspond to the situational awareness score associated with the driver's situational awareness associated with the particular object such that a higher situational awareness score may indicate a higher level of attentiveness with respect to the object based on a longer dwell time and/or a closer gaze point. Alternatively, a lower situational awareness score may indicate a lower level of attentiveness with respect to the object based on a shorter dwell time and/or a further gaze point.

As discussed below, the situational awareness application 106 may analyze various forms of sensor-based data and may extract features associated with objects located within the driving scene and with the driver's perception of the objects. The situational awareness application 106 may analyze a plurality of features associated with the object, the driver's gaze point with respect to the object, and/or the driver's memory of the object including, but not limited to, gaze point-based features, human visual sensor dependent features, object spatial-based features, object property-based features, and human short-term memory-based features.

With continued reference to FIG. 1, the ECU 104 may be configured to be operably connected to a plurality of additional components of the vehicle 102, including a vehicle camera system 110, a vehicle LiDAR system 112, eye gaze sensors 122, a storage unit 116, a vehicle autonomous controller 118, and vehicle systems/control units 120 of the vehicle 102. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102.

The ECU 104 may also include a communication device (not shown) for sending data internally within (e.g., between one or more components) the vehicle 102 and communicating with externally hosted computing systems (e.g., external to the vehicle 102). Generally, the ECU 104 may communicate with the storage unit 116 to execute the one or more applications, operating systems, vehicle system and subsystem user interfaces, and the like that are stored within the storage unit 116.

In one embodiment, the ECU 104 may communicate with the vehicle autonomous controller 118 to execute autonomous driving commands to operate the vehicle 102 to be fully autonomously driven or semi-autonomously driven in a particular manner. As discussed below, the autonomous driving commands may be based on commands provided by the situational awareness application 106 to navigate the vehicle 102 within the driving scene to autonomously control one or more functions of the vehicle 102 to account for the driver's situational awareness with respect to respective objects that are located within the driving scene of the vehicle 102.

As discussed below, based on one or more executable command instructions that may be communicated by the situational awareness application 106, the vehicle autonomous controller 118 may be configured to autonomously control the vehicle 102 to operate in a manner based on the one or more commands that are output by the application 106. For example, the situational awareness application 106 may send autonomous control commands to the vehicle autonomous controller 118 to ensure that the vehicle 102 is autonomously operated to complete acceleration, braking, and/or steering in a way that accounts for objects that may be determined to be assigned a lower situation awareness score that may indicate a lower awareness level with respect to the driver's awareness of the respective objects.

In one or more embodiments, the vehicle autonomous controller 118 may autonomously control the operation of the vehicle 102 by providing one or more commands to one or more of the vehicle systems/control units 120 to provide full autonomous or semi-autonomous control of the vehicle 102 to follow vehicle autonomous commands provided by the application 106. Such autonomous control of the vehicle 102 may be provided by sending one or more commands to control one or more of the vehicle systems/control units 120 to operate (e.g., drive) the vehicle 102 during one or more circumstances (e.g., when providing driver assist controls), and/or to fully control driving of the vehicle 102.

In some embodiments, one or more commands may be provided to control one or more advanced driver assist systems (ADAS) (not shown) of the vehicle 102 to provide one or more alerts and/or warnings that may pertain to the presence and/or positions of one or more objects to account for objects that may be determined to be assigned a lower situation awareness score that may indicate a lower situational awareness level with respect to the driver's awareness of the respective objects.

The one or more commands may be provided to one or more vehicle systems/control units 120 that include, but are not limited to an engine control unit, a braking control unit, a transmission control unit, a steering control unit, and the like to control the vehicle 102 to be autonomously driven based on one or more autonomous commands that are output by the situational awareness application 106 to navigate the vehicle 102 within the driving scene of the vehicle 102 while accounting for one or more objects that may be determined to be assigned a lower situation awareness score that may indicate a lower awareness level with respect to the driver's awareness of the respective objects.

In one or more embodiments, the vehicle systems/control units 120 may be operably connected to the vehicle dynamic sensors 114 of the vehicle 102. The vehicle dynamic sensors 114 may be configured to receive inputs from one or more vehicle systems, sub-systems, control systems, and the like. In one embodiment, the vehicle dynamic sensors 114 may be included as part of a Controller Area Network (CAN) of the vehicle 102 and may be configured to provide vehicle dynamic data to the ECU 104 to be utilized for one or more vehicle systems, sub-systems, control systems, and the like. The vehicle dynamic sensors 114 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the vehicle dynamic sensors 114 may provide dynamic data in the form of one or more values (e.g., numeric levels) that are associated with the real-time dynamic performance of the vehicle 102 as one or more driving maneuvers are conducted and/or as the vehicle 102 is controlled to be autonomously driven. As discussed below, dynamic data that is output by the vehicle dynamic sensors 114 may be associated with a real time dynamic operation of the vehicle 102 as it is traveling within the driving scene. The dynamic data may be analyzed by the situational awareness application 106 to determine dynamic constraints associated with the vehicle 102 to thereby autonomously control the vehicle 102 to operate based on such constraints.

In an exemplary embodiment, the eye gaze sensors 122 may be configured as one or more cameras located within the vehicle 102 and hardware configured to interpret video or image data sensed by the camera(s) to detect the driver's eye positions within the vehicle 102 in order to determine the driver's gaze points. In an alternate embodiment, the eye gaze sensors 122 may be included as part of a wearable device (e.g., wearable glasses) that may be configured to detect the driver's eye positions within the vehicle 102 in order to determine the driver's gaze points as the vehicle 102 is being operated within the driving scene. The driver's gaze points may pertain to the driver's focus with respect to the driver's foveal and peripheral vision of the driving scene and one or more dynamic objects and/or static objects that may be located within the driving scene.

In one embodiment, the eye gaze sensors 122 may communicate gaze data that pertains to the driver's gaze focus with respect to the driver's foveal and peripheral vision of the driving scene to the situational awareness application 106. The situational awareness application 106 may be configured to analyze the gaze data that pertains to the driver's gaze focus with respect to the driver's foveal and peripheral vision of the driving scene to extract a plurality of gaze point based features. The plurality of gaze point based features may include, but may not be limited to, $G_{pause}$—gaze distance to an object at a pause (e.g., when the vehicle 102 is in a stopped state), measured in degree; $G_{min}$—minimum gaze distance to an object within the analysis time window before a pause, measured in degree; and $G_{average}$—average gaze distance of an object during an analysis window, measured in degree.

In an exemplary embodiment, the situational awareness application 106 may also be configured to extract human visual sensor dependent features that considers the peripheral vision of the driver 108 with respect to the recognition of well-known structures and the detection of motions. The situational awareness application 106 may analyze the driver's peripheral vision using the presumption that the driver 108 is using non-foveal vision for tracking detected objects and detecting moving objects. In one confirmation, the system may use fovea ($ë_1$=2.5 degree radius), parafovea ($ë_2$=4.1 degree), perifovea ($ë_3$=9.1 degree) and macula ($ë_4$=15.0 degree).

The situational awareness application 106 may be configured to extract a plurality of features per the four aforementioned radius range that may include, but may not be limited to: H elapse-time length—measured in second since the last frame where the gaze distance was less than a radius n till the pause. A small value, for example less than 1 second, means the driver perceives a particular object right before the pause and is likely aware of it; $HV_{dwell}^{ë_n}$—total dwell time measured in second when the gaze distance was less than the radius $ë_n$; and $HV_{average}^{ë}$—average gaze distance measured in degree while the distance was within a radius threshold of $ë_n$. If the gaze distance is larger than this threshold, the average distance during the whole analysis window may be used.

In one or more embodiments, the situational awareness application 106 may be configured to extract object spatial-based features that allows the understanding of the difference in objects' position information in the driving scene as impactful to the driver's awareness, within the analysis time window before a pause. The system may be configured to extract a plurality of object spatial-based features that may include, but may not be limited to: $OS_{proximity}$—distance between the object and the vanishing point of the scene, measured in degree; $OS_{duration}$—accumulative time length that the object is visible in the scene within the analysis time window before a pause, measured in seconds; $OS_{size}$—relative size of the object, also considered as the distance from the object to the vehicle approximated by the relative height of the object. Specifically, the height of the objects are normalized based on different object types, either vehicles or pedestrians. Additional object spatial-based features that may be extracted may include $OS_{density}$—density of the scene, measured by the total number of objects in the scene.

The situational awareness application 106 may be configured to extract object property-based features that include, but may not be limited to: $OP_{type}$—object type, which is a binary feature representing if the object is a pedestrian or a vehicle; $OP_{relevance}$—a binary indicator of whether an (dynamic) object's trajectory intersects with the vehicle's trajectory within the analysis time window before a pause; O light—traffic light condition for each object, either green or red (or unknown), measured by a binary variable; $OP_{contrast}$—object static salience or contrast against the background. It represents the visual difference between the color of an object and the background, measured by an ordinal variable. For instance, this feature is considered as "low" when a pedestrian is dressed in dark clothing and the pedestrian is in shadow.

An additional object property-based that may be extracted may include $O_{movement}$—which represents the dynamic motion saliency of a target object at a pause. Each object is annotated as one of four categories: static, slow, medium, high. For instance, "Static" means the object is not moving at the pause, and "Low" means that the object is moving in a regular walking speed, i.e., all walking pedestrians and vehicles in an idle creep; O change—the area changing feature represents the potential of projection errors of target objects. It is set to 1 if the object crosses the border of the target area within the last second before the pause. This feature is necessary because the driver may fail to answer correctly because of such crossing trajectories.

In one or more embodiments, the storage unit 116 of the vehicle 102 may be configured to store one or more executable files associated with one or more operating systems, applications, associated operating system data, application data, vehicle system and subsystem user interface data, and the like that are executed by the ECU 104. In one embodiment, the storage unit 116 may be configured to store data associated with one or more of the gaze point features discussed above. In one configuration, upon determining the gaze point features, the situational awareness application 106 may be configured to access the storage unit 116 and may store the data associated with one or more of the gaze point features. Additionally, the situational awareness application 106 may be configured to access the storage unit 116 and may retrieve the data associated with one or more of the gaze point features to determine one or more situational awareness scores that are associated with the driver's predicted situational awareness that pertain the driver's awareness and attentiveness to each dynamic object and each static object that is located within the driving scene of the vehicle 102.

With continued reference to FIG. 1, the vehicle camera system 110 may include one or more of the cameras (not shown) that may be positioned in one or more directions and at one or more areas to capture one or more images of the driving scene of the vehicle 102 (e.g., images of the roadway on which the vehicle 102 is traveling). The one or more cameras of the vehicle camera system 110 may be disposed at external front portions of the vehicle 102, including, but not limited to different portions of a vehicle dashboard, a vehicle bumper, vehicle front lighting units, vehicle fenders, and a vehicle windshield. In one embodiment, the one or more cameras may be configured as RGB cameras that may capture RGB bands that are configured to capture rich information about object appearance, as well as relationships and interactions between the vehicle 102 and objects within the surrounding environment of the vehicle 102.

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the driving scene. The vehicle camera system 110 may be configured to convert one or more RGB images/videos (e.g., sequences of images) into image data that is communicated to the situational awareness application 106 to be analyzed.

In an exemplary embodiment, the vehicle LiDAR system 112 may be operably connected to a plurality of LiDAR sensors (not shown). In particular, the vehicle LiDAR system 112 may include one or more planar sweep lasers that include respective three-dimensional LiDAR sensors that may be configured to oscillate and emit one or more laser beams of ultraviolet, visible, or near infrared light toward the scene of the surrounding environment of the vehicle 102. The plurality of LiDAR sensors may be configured to receive one or more reflected laser waves (e.g., signals) that are reflected off one or more objects such as surrounding vehicles located within the driving scene of the vehicle 102. In other words, upon transmitting the one or more laser beams to the driving scene, the one or more laser beams may be reflected as laser waves by one or more obstacles that include static objects and/or dynamic objects that may be located within the driving scene of the vehicle 102 at one or more points in time.

In one embodiment, each of the plurality of LiDAR sensors may be configured to analyze the reflected laser waves and output respective LiDAR data to the situational awareness application 106. The LiDAR data may include LiDAR coordinates that may be associated with the locations, positions, depths, and/or dimensions (e.g., measurements) of one or more dynamic objects such as the surrounding vehicles and pedestrians that may be located within the dynamic environment.

As discussed below, image data provided by the vehicle camera system 110 and/or the LiDAR data provided by the vehicle LiDAR system 112 may be communicated to the situational awareness application 106 to be analyzed against the one or more object classifiers to classify static objects and dynamic objects located within the driving scene. Additionally, the image data provided by the vehicle camera system 110 and/or the LiDAR data provided by the vehicle LiDAR system 112 may be aggregated and analyzed to determine the positions of the static objects and dynamic objects with respect to the location of the vehicle 102 to thereby determine the gaze points of the driver's eye gaze with respect to each of the objects that are located within the driving scene.

II. The Driver Situation Awareness Prediction Application and Related Methods

Components of the situational awareness application 106 will now be described according to an exemplary embodiment and with continued reference to FIG. 1. In an exemplary embodiment, the situational awareness application 106 may be stored on the storage unit 116 and executed by the ECU 104 of the vehicle 102. In another embodiment, the situational awareness application 106 may be stored on an externally hosted computing infrastructure and may be accessed by a telematics control unit of the vehicle 102 to be executed by the ECU 104 of the vehicle 102.

The general functionality of the situational awareness application 106 will now be discussed. In an exemplary embodiment, the situational awareness application 106 may include a plurality of modules 124-130 that may be configured to provide driver situation awareness prediction using human visual sensory and memory mechanism. The plurality of modules 124-128 may include a data reception module 124, a situational awareness analysis module 126, and a vehicle control module 128. However, it is appreciated that the situational awareness application 106 may include one or more additional modules and/or sub-modules that are included in lieu of the modules 124-128.

Figure 2:
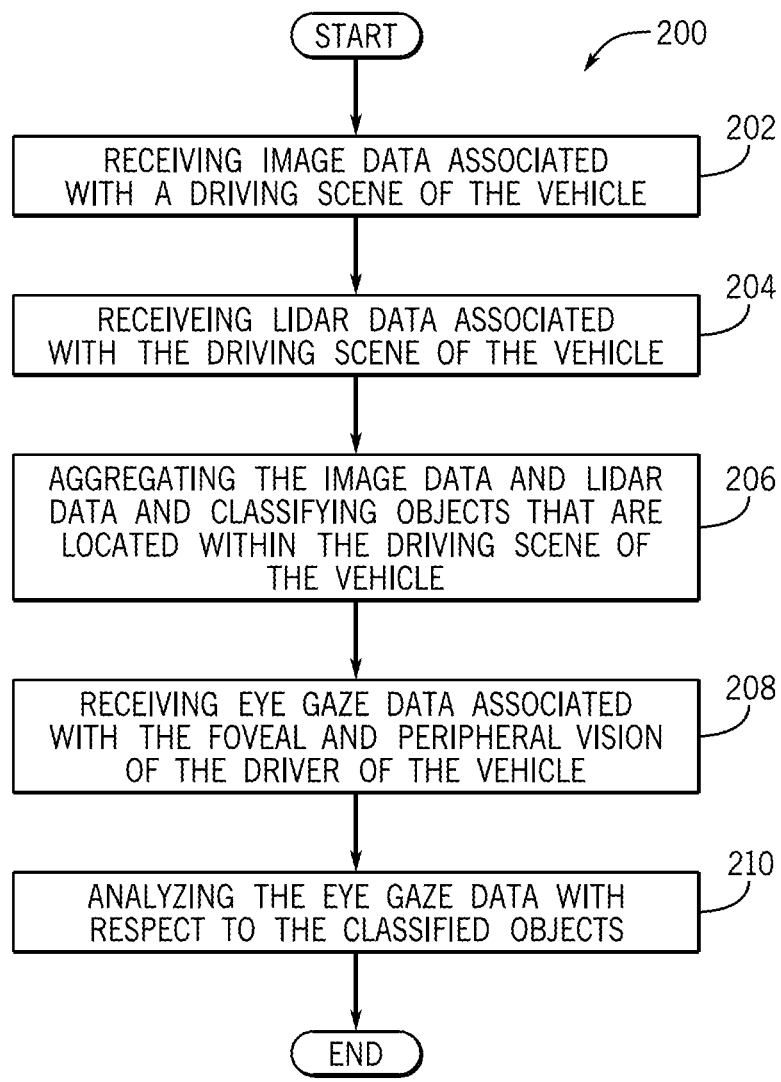
FIG. 2 is a process flow diagram of a method for receiving and processing data associated with the driving scene of a vehicle and an eye gaze of the driver of the vehicle according to an exemplary embodiment of the present disclosure.

FIG. 2 is a process flow diagram of a method 200 for receiving and processing data associated with the driving scene of a vehicle 102 and the eye gaze of the driver 108 of the vehicle 102 according to an exemplary embodiment of the present disclosure. FIG. 2 will be described with reference to the components of FIG. 1 though it is to be appreciated that the method 200 of FIG. 2 may be used with other systems/components. The method 200 may begin at block 202, wherein the method 200 may include receiving image data associated with a driving scene of the vehicle 102.

In one embodiment, the data reception module 124 of the situational awareness application 106 may be configured to communicate with the vehicle camera system 110 to collect image data associated untrimmed images/video of the driving scene of the vehicle 102. In some configurations, the image data may pertain to one or more first person viewpoint RGB images/videos of the driving scene of the vehicle 102. In particular, the image data may pertain to one or more RGB images/video of the surrounding static objects and dynamic objects that are located within the driving scene that are captured by one or more cameras that are operably connected to the vehicle camera system 110. In some embodiments, the data reception module 124 may package and store the image data on the storage unit 116 to be evaluated at one or more points in time.

The method 200 may proceed to block 204, wherein the method 200 may include receiving LiDAR data associated with the driving scene of the vehicle 102. In an exemplary embodiment, the data reception module 124 may communicate with the vehicle LiDAR system 112 of the vehicle 102 to collect LiDAR data that includes LiDAR based observations from the vehicle 102. The LiDAR based observations may indicate the location, range, and positions of the one or more objects off which the reflected laser waves were reflected with respect to a location/position of the vehicle 102. In some embodiments, the data reception module 124 may package and store the LiDAR data on the storage unit 116 to be evaluated at one or more points in time.

The method 200 may proceed to block 206, wherein the method 200 may include aggregating the image data and LiDAR data and classifying objects that are located within the driving scene of the vehicle 102. In an exemplary embodiment, the data reception module 124 may communicate with the situational awareness analysis module 126 of the situational awareness application 106 to provide artificial intelligence capabilities to conduct multimodal aggregation of the image data received from the vehicle camera system 110 with the LiDAR data received from the vehicle LiDAR system 112. The simulation module 136 may aggregate the image data and the LiDAR data into aggregated driving scene data that is associated with the driving scene to be evaluated further by the situation awareness module.

In an exemplary embodiment, the situational awareness analysis module 126 may be configured to access the storage unit 116 of the vehicle 102 to analyze one or more object classifiers that are stored upon the storage unit 116. The one or more object classifiers may include pre-trained object classification data that may be associated with aggregated image coordinates and LiDAR coordinates that may pertain to specific types of static objects (e.g., trees, street signs, poles, guard rails) and specific types of dynamic objects (e.g., additional vehicles, pedestrians, bicyclists) to classify static objects and dynamic objects located within the driving scene.

In one configuration, the situational awareness analysis module 126 may be configured to analyze the aggregated driving scene data to extract image coordinates and LiDAR coordinates that pertain to objects that are identified as located within the driving scene. The situational awareness analysis module 126 may be configured to process bounding boxes around each of the objects within the driving scene. Upon the processing of bounding boxes around each of the objects, the situational awareness analysis module 126 may be configured to analyze the one or more object classifiers to compare the image coordinates and LiDAR coordinates that pertain to objects that are located within the driving scene against the pre-trained object classification data to thereby classify objects and positions of objects that are included within each of the bounding boxes that are processed around each of the objects that are located within the driving scene of the vehicle 102.

As such, static objects that are located within the driving scene may be classified accordingly and dynamic objects that are located within the driving scene may be classified accordingly. Additionally, the positions of the classified static objects and dynamic objects that are tracked and determined with respect to a position of the vehicle 102 within the driving scene may be classified accordingly. The situational awareness analysis module 126 may be configured to communicate the classification of the objects to the data reception module 124 to allow the data reception module 124 to further receive gaze data associated with the driver 108.

With continued reference to FIG. 2, upon aggregating the image data and the LiDAR data and classifying the objects that are located within the driving scene of the vehicle 102, the method 200 may proceed to block 208, wherein the method 200 may include receiving eye gaze data associated with the foveal and peripheral vision of the driver 108 of the vehicle 102. In an exemplary embodiment, the data reception module 124 may be configured to communicate with the eye gaze sensors 122 of the vehicle 102 to receive gaze data associated with the eye gaze of the driver 108 of the vehicle 102 for a period of time during which the objects that have been classified by the situational awareness analysis module 126.

As discussed, the eye gaze sensors 122 may be configured as one or more cameras located within the vehicle 102 and hardware configured to interpret video or image data sensed by the camera(s) to detect the driver's eye positions within the vehicle 102 in order to determine the driver's gaze points. In an alternate embodiment, the eye gaze sensors 122 may be included as part of a wearable device that may be configured to detect the driver's eye positions within the vehicle 102 in order to determine the driver's gaze points as the vehicle 102 is being operated within the driving scene. The driver's gaze points may pertain to the driver's focus with respect to the driver's foveal and peripheral vision of the driving scene and one or more dynamic objects and/or static objects that may be located within the driving scene.

The method 200 may proceed to block 210, wherein the method 200 may include analyzing the eye gaze data with respect to the classified objects. Upon the receipt of eye gaze data, the data reception module 124 may be configured to communicate the eye gaze data associated with gaze points of the driver's eye gaze towards the driving scene of the vehicle 102. In one configuration, the situational awareness analysis module 126 may be configured to analyze the objects included within the processed bounding boxes and may determine gaze point values associated with the driver's foveal and peripheral vision of the driving scene with specific emphasis to each of the bounding boxes that may encapsulate respective dynamic objects and static objects that may be located within the driving scene.

In particular, the situational awareness analysis module 126 may be configured to determine gaze point values that are associated with the driver's eye gaze towards the driving scene that considers the driver's eye gaze with respect to each of the classified dynamic objects and classified static objects. As discussed below, the situational awareness analysis module 126 may further extract eye gaze features associated with the driver's eye gaze with respect to each of the classified dynamic objects and classified static objects to determine a correlation between the driver's awareness of each of the dynamic objects and/or static objects within the driving scene. Specifically, gaze coordinates were projected into the scene video and "gaze distance" is defined as the distance between a gaze center and the nearest edge of each bounding box. As discussed below, such information may be further analyzed to thereby determine the driver's situational awareness that is associated with each of the objects that are located within the driving scene of the vehicle 102.

Figure 3:
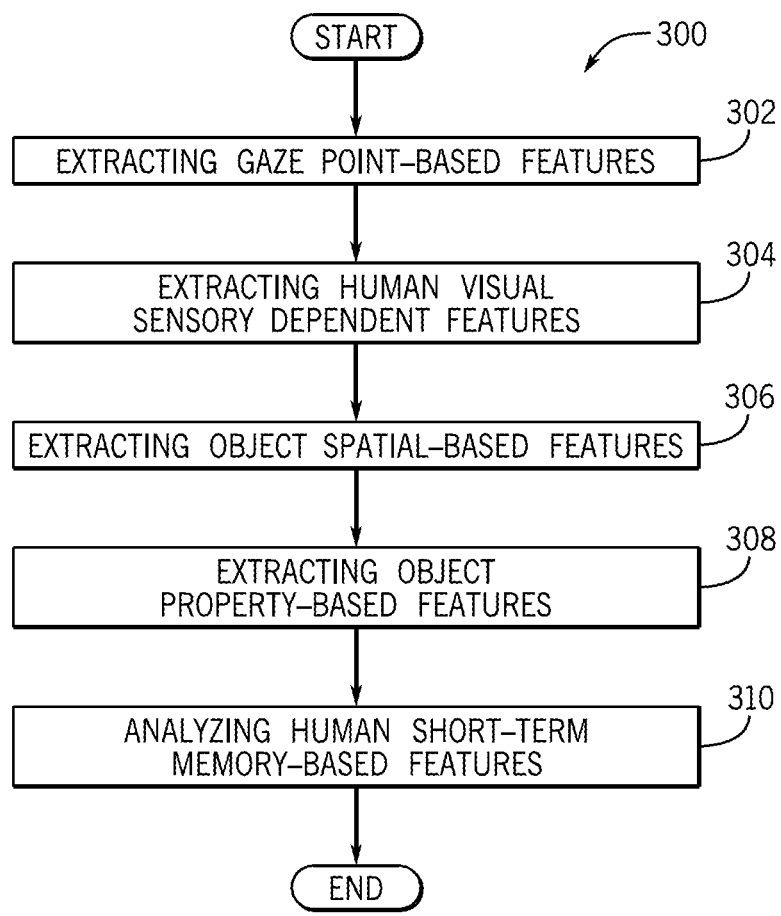
FIG. 3 is a process flow diagram of a method for analyzing features associated with the driver's perceptual engagement with each of the objects that are located within the driving scene of the vehicle based on the driver's eye gaze according to an exemplary embodiment of the present disclosure.

FIG. 3 is a process flow diagram of a method 300 for analyzing features associated with the driver's perceptual engagement with each of the objects that are located within the driving scene of the vehicle 102 based on the driver's eye gaze according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include extracting gaze point-based features.

In an exemplary embodiment, the situational awareness analysis module 126 of the situational awareness application 106 may be configured to analyze the determined gaze point values that are associated with the driver's eye gaze towards the driving scene that considers the driver's eye gaze with respect to each of the classified dynamic objects and classified static objects to extract gaze point-based features. The gaze point-based features utilize the positional relationship between target objects and participants' gaze center coordinates. In one configuration, the situational awareness analysis module 126 may be configured to extract gaze point-based features that include, but are not limited to: $G_{pause}$—gaze distance to an object at a pause (e.g., vehicle stop), measured in degree, $G_{min}$—minimum gaze distance to an object within an analysis time window before a pause, measured in degree, and $G_{average}$—average gaze distance of an object during an analysis window, measured in degree.

The method 300 may proceed to block 304, wherein the method 300 may include extracting human visual sensory dependent features. In one embodiment, the situational awareness analysis module 126 may evaluate the gaze data to evaluate the human visual sensory dependent features associated with non-foveal vision for tracking detected objects. In one configuration, the situational awareness analysis module 126 may use values: fovea ($ë\_1=2.5$ degree radius), parafovea ($ë\_2=4.1$ degree), perifovea ($ë\_3=9.1$ degree) and macula ($ë\_4=15.0$ degree) as a radius range to extract the human visual sensory dependent features.

The human visual sensory dependent features extracted by the situational awareness analysis module 126 may include, but may not be limited to: H elapse-time: a length of time measured in second(s) since the last frame where the gaze distance was less than a radius n till the pause. A small value, for example less than 1 second, means the driver perceives the object right before the pause and is likely aware of it, $HV_{dwell}{}^{ë_n}$—total dwell time measured in second when the gaze distance was less than the radius $ë_n$, and $HV_{average}{}^{ë}$=average gaze distance measured in degree while the distance was within a radius threshold of $ë_n$. If the gaze distance is larger than this threshold, the average distance during the whole analysis window may be used.

With continued reference to FIG. 3, the method 300 may proceed to block 306, wherein the method 300 may include extracting object spatial-based features. In one embodiment, the situational awareness analysis module 126 may evaluate the gaze data to evaluate the object spatial-based features. The object spatial-based features consider properties of each object that is located within the driving scene of the vehicle 102 and provides an understanding of the difference in each object's position information in the driving scene which may impact the driver's awareness of the respective object within an analysis time window.

The object spatial-based features extracted by the situational awareness analysis module 126 may include, but may not be limited to: $OS_{proximity}$—a distance between the object and a vanishing point of the scene, measured in degree, $OS_{duration}$—accumulative time length that the object is visible in the scene within the analysis time window before a pause, measured in seconds, $OS_{size}$—relative size of the object, also considered as the distance from the object to the vehicle approximated by the relative height of the object. Specifically, the height of each of the objects are normalized based on different object types, such vehicles, pedestrians, and/or particular static objects, and $OS_{density}$—density of the scene, measured by the total number of objects in the scene.

The method 300 may proceed to block 308, wherein the method 300 may include extracting object property-based features. In one embodiment, the situational awareness analysis module 126 may evaluate the gaze data to evaluate the object property-based features associated with each of the objects that are located within the driving scene of the vehicle 102. In one configuration, other than the objects' spatial-based features, the situational awareness analysis module 126 may also extract property-based features to access the driver's awareness to each object located within the driving scene of the vehicle 102. The property-based features may consider an object's visual salience from the driver's point of view. For example, the property-based features may enable the situational awareness application 106 to consider that a pedestrian crossing a driving lane of the vehicle 102 would have a higher significant level and visual salience than another vehicle parking at a roadside with respect to the driver's view. For objects with high significance and salience the driver could easily observe the pedestrian and take further actions to prevent potential accidents.

The situational awareness analysis module 126 may be configured to extract object property-based features that include, but are not limited to: $OP_{type}$—object type, which is a binary feature representing if the object is a pedestrian or a vehicle, $OP_{relevance}$—a binary indicator of whether an (dynamic) object's trajectory intersects with the vehicle's trajectory within the analysis time window before a pause; O light—traffic light condition for each object, either green or red (or unknown), measured by a binary variable, $OP_{contrast}$—object static salience or contrast against the background. It represents the visual difference between the color of an object and the background, measured by an ordinal variable. For instance, this feature is considered as "low" when a pedestrian is dressed in dark clothing and the pedestrian is in a shadow.

Another property-based feature that is extracted by the situational awareness analysis module 126 includes $O_{movement}$—which represents the dynamic motion saliency of each object at a pause. Each object is annotated as one of four categories: static, slow, medium, high. For instance, "static" means the object is not moving at the pause, and "low" means that the object is moving in a regular walking speed, (i.e., all walking pedestrians and vehicles in an idle creep. Additionally, a property-based feature that is extracted by the situational awareness analysis module 126 includes O change—the area changing feature represents the potential of projection errors of target objects. It is set to 1 if the object crosses the border of the target area within the last second before the pause.

Referring again to FIG. 3, upon extraction of various features from the gaze data, the method 300 may proceed to block 310, wherein the method 300 may include analyzing human short-term memory-based features. In an exemplary embodiment, the situational awareness analysis module 126 may be configured to analyze the driver's short-term memory as another indicator of the driver's situational awareness with respect to each object that is located within the driving scene of the vehicle 102.

Figure 4:
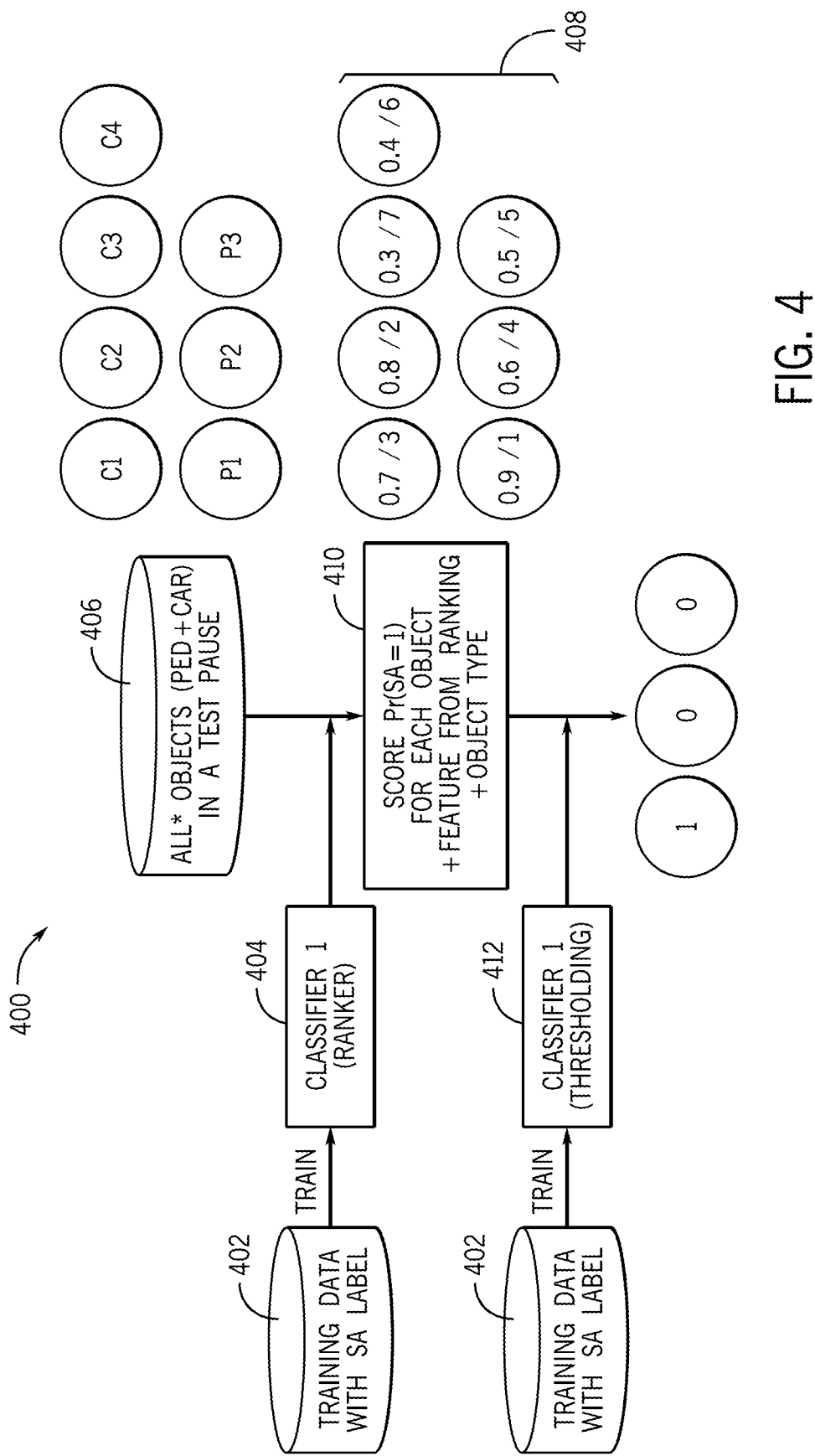
FIG. 4 is a general schematic overview of a classifier structure utilized by a situational awareness analysis module of a situational awareness application according to an exemplary embodiment of the present disclosure.

With reference to FIG. 4, a general schematic overview of a classifier structure 400 utilized by the situational awareness analysis module 126 of the situational awareness application 106, the classifier structure 400 utilizes training data 402 that is stored upon the storage unit 116 of the vehicle 102. The training data 402 may be pre-trained with situational awareness (SA) labels that allow classifiers 404, 412 to be trained based on various features that take into the user's short-term memory that may be associated with salient objects versus non-salient objects within the driving scene. In one or more embodiments, the situational awareness analysis module 126 may calculate a memory score for each object. The memory score for object $n(M_n)$ is calculated as $M_n = \tan h(R_n - N)$ where N is a parameter that approximates the size of the human short-term memory.

Figure 5:
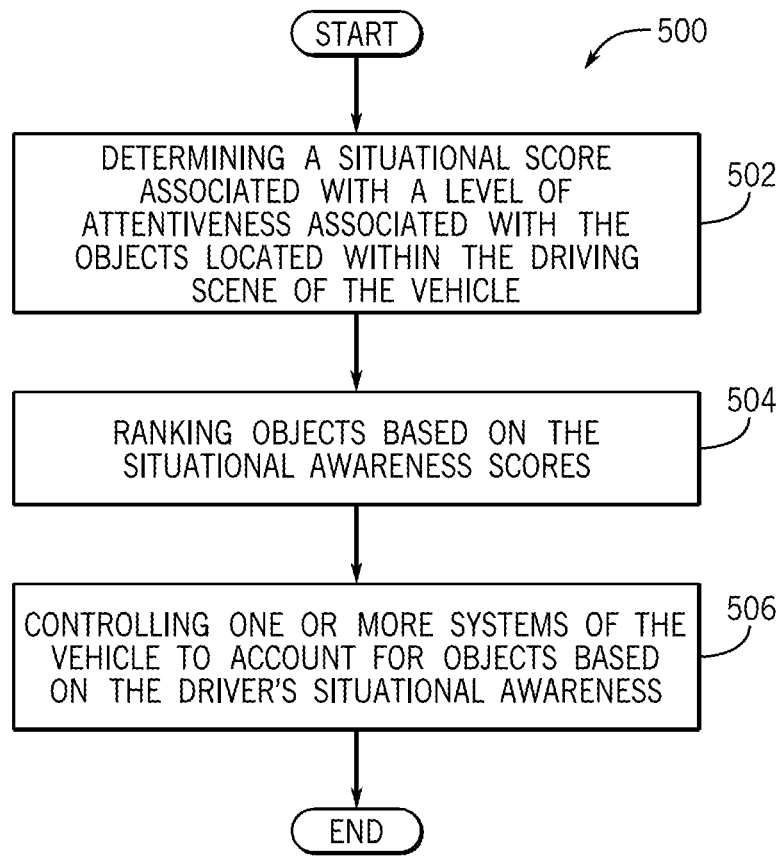
FIG. 5 is a process flow diagram of a method of determining situational awareness scores associated with objects that are located within the driving scene of the vehicle according to an exemplary embodiment of the present disclosure.

FIG. 5 is a process flow diagram of a method 500 of determining situational awareness scores associated with objects that are located within the driving scene of the vehicle 102 according to an exemplary embodiment of the present disclosure. FIG. 5 will be described with reference to the components of FIG. 1 though it is to be appreciated that the method 500 of FIG. 5 may be used with other systems/components. The method 500 may begin at block 502, wherein the method 500 may include determining a situational score associated with a level of attentiveness associated with the objects located within the driving scene of the vehicle 102.

In an exemplary embodiment, the situational awareness analysis module 126 may be configured to analyze all of the objects that are located within the driving scene within a pause (stopped vehicle state) and may utilize the classifier 404 to apply binary classifiers to all of the dynamic objects and static objects that are located within the driving scene. The binary classifiers may indicate a probability of a level of situational awareness of the driver 108 with respect to each respective object that is located within the driving scene. The binary classifiers may consider all of the extracted features and the memory score associated with each object to calculate a situational awareness score that is associated with each of the objects located within the driving scene.

In particular, the situational awareness analysis module 126 may weight and aggregate the gaze point-based features, the human visual sensory dependent features, the object spatial-based features, the object property-based features, and the human short-term memory-based features (e.g., the memory score) to calculate a situational awareness score for each of the objects that are located within the driving scene of the vehicle 102. As discussed, the situational awareness score pertains to the driver's awareness and attentiveness to each dynamic object and each static object that is located within the driving scene of the vehicle 102.

The method 500 may proceed to block 504, wherein the method 500 may include ranking objects based on the situational awareness scores. In an exemplary embodiment, the situational awareness analysis module 126 may be configured to rank the dynamic objects and the static objects based on the situational awareness score that is calculated for each object. With reference again to FIG. 4, the rankings 408 for each of the objects may be based on a situational awareness weight that may be based on the classification of the object (e.g., dynamic vs. static), the position of the object with respect to the vehicle 102, and based on the gaze point-based features, the human visual sensory dependent features, the object spatial-based features, the object property-based features, and the human short-term memory-based features associated with each respective object.

In one embodiment, upon ranking of objects based on the situational awareness scores, the situational awareness analysis module 126 may be configured to extract an extract an extra feature based on the situational ranking. The extra feature may include a score Pr(SA=1) for each object that indicates an object type as a feature from each ranking. The situational awareness analysis module 126 may be configured to add a ranking of Pr(SA=1) and probabilities Pr(SA=1) into second classifier training of a second classifier 412 to simulate a memory system by suppressing objects exceeding human short-term memory capacity that emulates the driver's situational awareness.

Accordingly, the results from the classifier 404 may be utilized as a probability of each object being aware of by the driver, as part of the input for the second classifier 412. In one configuration, the second classifier 412 may provide the situational awareness threshold that may be utilized to determine which objects are to be considered when providing vehicle controls to account for objects that the driver of the vehicle 102 may not be highly aware of.

With continued reference to FIG. 5, the method 500 may proceed to block 506, wherein the method 500 may include controlling one or more systems of the vehicle 102 to account for objects based on the driver's situational awareness. In an exemplary embodiment, upon ranking of objects based on the situational awareness scores and determining which objects are to be considered when providing vehicle controls to account for objects that a driver of the vehicle 102 may not be highly aware of based on the situational awareness threshold that may be associated with the type of object and position of the object utilized through the second classifier 412, the situational awareness analysis module 126 may be configured to communicate respective data to the vehicle control module 130 of the situational awareness application 106. In other words, upon ranking of objects based on the situational awareness scores and determining which objects are to be considered when providing vehicle controls to account for objects that the driver of the vehicle 102 may not be highly aware of based on the situational awareness threshold that may be associated with the type of object and position of the object utilized through the second classifier 412.

In one embodiment, the vehicle control module 130 may be configured to analyze the data associated with the rankings that are based on the driver's situational awareness of each object and further thresholding that may be associated with the type of each object and the position of each object. In one configuration, the vehicle control module 130 may be configured to output vehicle autonomous commands that may be associated with driving parameters to autonomously control the operation of the vehicle 102 to account for one or more objects that may be ranked higher and/or above particular threshold that may indicate that the driver of the vehicle 102 may highly aware of the objects.

In one embodiment, the vehicle control module 130 may be configured to communicate the autonomous control commands to the vehicle autonomous controller 118 of the vehicle 102. The vehicle autonomous controller 118 may thereby operably control the vehicle systems/control units 120 of the vehicle 102 to autonomously operate the vehicle 102 according to the autonomous control commands to providing one or more driving maneuvers to account for one or more objects that may be ranked higher and/or above particular threshold(s) that may indicate that the driver of the vehicle 102 may not be highly aware them.

In particular, the vehicle 102 may be operably controlled to autonomously operate (e.g., with the application 106 of a particular speed, acceleration, steering angle, throttle angle, braking force, etc.) according to the autonomous control commands that adhere to dynamic constraints of the vehicle 102 to account for objects that have a lower situational awareness score than one or more situational awareness threshold scores that may be associated with the object type and/or position of the object(s) that may indicate that the driver 108 of the vehicle 102 is not highly aware of one or more particular objects. Accordingly, the vehicle 102 may be operated to drive within the driving scene without overlap with static obstacles and dynamic obstacles while simultaneously optimizing speed and steering, minimizing control effort associated with autonomous dynamic parameters of the vehicle 102.

In another embodiment, the vehicle control module 130 may be configured to analyze the data associated with the rankings that are based on the driver's situational awareness of each object and further thresholding that may be associated with the type of each object and the position of each object. In one configuration, the vehicle control module 130 may be configured to output alert output commands to the vehicle systems/control units 120 of the vehicle 102 to provide the driver 108 of the vehicle 102 with one or more warnings and/or alerts that may be associated with one or more objects that are located within the driving scene. In particular, the output alert output commands may be provided to the ADAS of the vehicle 102 to provide one or more alerts and/or warnings that may pertain to the presence and/or positions of one or more objects to account for objects that may be determined to be assigned a lower situational awareness score that may indicate a lower awareness level with respect to the driver's awareness of the respective objects.

Figure 6:
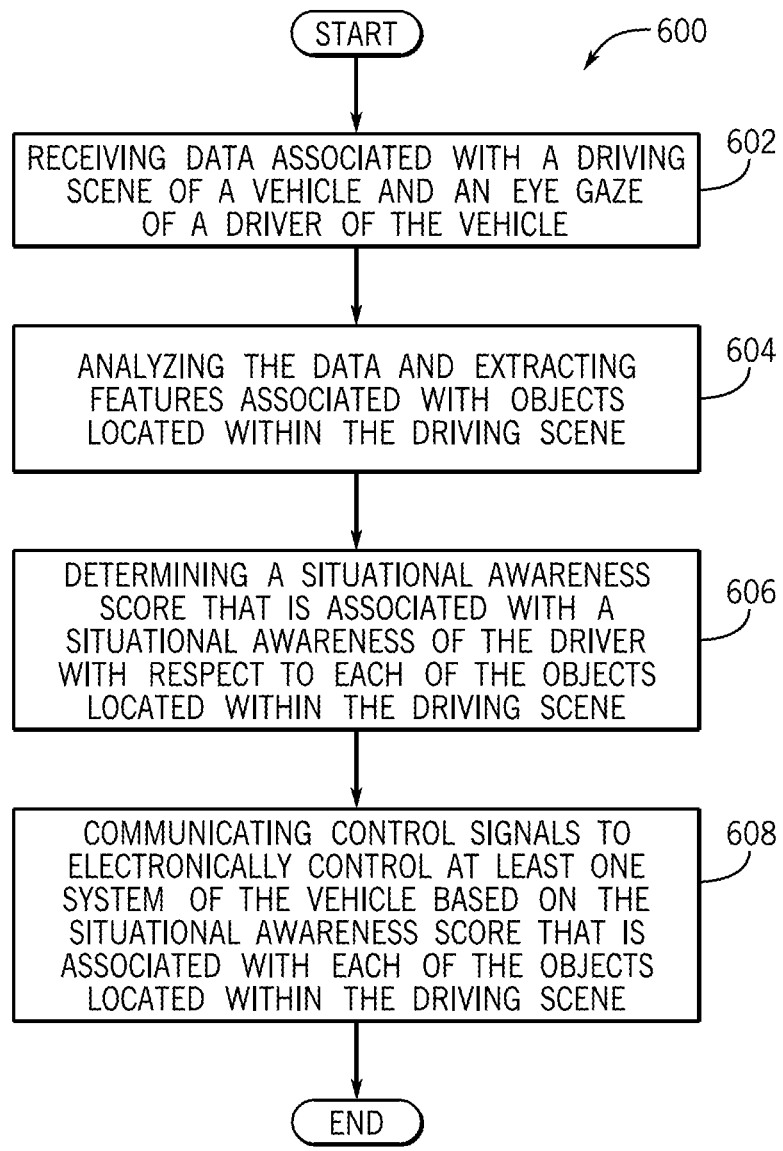
FIG. 6 is a process flow diagram of a method for improving driver situation awareness prediction using human visual sensory and memory mechanism according to an exemplary embodiment of the present disclosure.

As discussed above, the situational awareness application 106 accordingly provides a prediction model for estimating the driver's situational awareness by utilizing gaze behavior, object spatial and property-based features and human visual sensor and short-term memory mechanism. FIG. 6 is a process flow diagram of a method 600 for improving driver situation awareness prediction using human visual sensory and memory mechanism according to an exemplary embodiment of the present disclosure.

The method 600 may start at block 602, wherein the method 600 may include receiving data associated with a driving scene of a vehicle 102 and an eye gaze of a driver 108 of the vehicle 102. The method 600 may proceed to block 604, wherein the method 600 may include analyzing the data and extracting features associated with objects located within the driving scene.

The method 600 may proceed to block 606, wherein the method 600 may include determining a situational awareness score that is associated a situational awareness of the driver with respect to each of the objects located within the driving scene. The method 600 may proceed to block 608, wherein the method 600 may include communicating control signals to electronically control at least one system of the vehicle 102 based on the situational awareness score that is associated with each of the objects located within the driving scene.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for improving driver situation awareness prediction using human visual sensory and memory mechanism comprising:

receiving data associated with a driving scene of a vehicle and an eye gaze of a driver of the vehicle;

analyzing the data to determine gaze point values that are associated with a foveal and peripheral eye gaze of the driver and extracting features associated with objects located within the driving scene;

determining a situational awareness score that is associated with a situational awareness of the driver with respect to each of the objects located within the driving scene, wherein the situational awareness score is based on a duration and proximity of the eye gaze with respect to each of the objects; and communicating control signals to electronically control at least one system of the vehicle based on the situational awareness score that is associated with each of the objects located within the driving scene, wherein determining the situational awareness score includes analyzing a short-term memory of the driver as indicator of the situational awareness with respect to each object, wherein the short-term memory is associated with a memory of salient objects versus non-salient objects within the driving scene and a memory score is calculated for each object.

2. The computer-implemented method of claim 1, wherein receiving the data associated with the driving scene of the vehicle includes receiving image data associated with images of the objects located within the driving scene of the vehicle and LiDAR data associated with LiDAR detection of the objects located within the driving scene of the vehicle.

3. The computer-implemented method of claim 2, further including aggregating the image data and the LiDAR data into aggregated driving scene data that is associated with the driving scene, wherein the aggregated driving scene data is analyzed with respect to a classifier to classify the objects into dynamic objects and static objects.

4. The computer-implemented method of claim 3, wherein the extracted features include gaze point-based features that utilize a positional relationship between target objects and participants' gaze center coordinates.

5. The computer-implemented method of claim 3, wherein analyzing the data and extracting features associated with objects includes analyzing determined gaze point values that are associated with the eye gaze of the driver towards the driving scene to extract human visual sensory dependent features associated with non-foveal vision for tracking detected objects located within the driving scene.

6. The computer-implemented method of claim 3, wherein analyzing the data and extracting features associated with objects includes analyzing determined gaze point values that are associated with the eye gaze of the driver towards the driving scene to extract object spatial-based features that consider properties of each object that is located within the driving scene, wherein the object spatial-based features include a difference in each object's position information in the driving scene which impacts the awareness of the driver with respect to each object within an analysis time window.

7. The computer-implemented method of claim 3, wherein analyzing the data and extracting features associated with objects includes analyzing determined gaze point values that are associated with the eye gaze of the driver towards the driving scene to extract object property-based features that are associated with each of the objects that are located within the driving scene of the vehicle, wherein the object property-based features consider each object's visual salience from the driver's point of view.

8. The computer-implemented method of claim 1, wherein determining the situational awareness score includes weighing and aggregating gaze point-based features, human visual sensory dependent features, object spatial-based features, object property-based features, and human short-term memory-based features to calculate the situational awareness score for each of the objects, wherein each of the objects is ranked based on the situational awareness score for each of the objects.

9. A system for improving driver situation awareness prediction using human visual sensory and memory mechanism comprising:

a memory storing instructions when executed by a processor cause the processor to:

receive data associated with a driving scene of a vehicle and an eye gaze of a driver of the vehicle;

analyze the data to determine gaze point values that are associated with a foveal and peripheral eye gaze of the driver and extract features associated with objects located within the driving scene;

determine a situational awareness score that is associated with a situational awareness of the driver with respect to each of the objects located within the driving scene, wherein the situational awareness score is based on a duration and proximity of the eye gaze with respect to each of the objects; and communicate control signals to electronically control at least one system of the vehicle based on the situational awareness score that is associated with each of the objects located within the driving scene, wherein determining the situational awareness score includes analyzing a short-term memory of the driver as an indicator of the situational awareness with respect to each object, wherein the short-term memory is associated with a memory of salient objects versus non-salient objects within the driving scene and a memory score is calculated for each object.

10. The system of claim 9, wherein receiving the data associated with the driving scene of the vehicle includes receiving image data associated with images of the objects located within the driving scene of the vehicle and LiDAR data associated with LiDAR detection of the objects located within the driving scene of the vehicle.

11. The system of claim 10, further including aggregating the image data and the LiDAR data into aggregated driving scene data that is associated with the driving scene, wherein the aggregated driving scene data is analyzed with respect to a classifier to classify the objects into dynamic objects and static objects.

12. The system of claim 11, wherein the extracted features include gaze point-based features that utilize a positional relationship between target objects and participants' gaze center coordinates.

13. The system of claim 11, wherein analyzing the data and extracting features associated with objects includes analyzing determined gaze point values that are associated with the eye gaze of the driver towards the driving scene to extract human visual sensory dependent features associated with non-foveal vision for tracking detected objects located within the driving scene.

14. The system of claim 11, wherein analyzing the data and extracting features associated with objects includes analyzing determined gaze point values that are associated with the eye gaze of the driver towards the driving scene to extract object spatial-based features that consider properties of each object that is located within the driving scene, wherein the object spatial-based features include a difference in each object's position information in the driving scene which impacts the awareness of the driver with respect to each object within an analysis time window.

15. The system of claim 11, wherein analyzing the data and extracting features associated with objects includes analyzing determined gaze point values that are associated with the eye gaze of the driver towards the driving scene to extract object property-based features that are associated with each of the objects that are located within the driving scene of the vehicle, wherein the object property-based features consider each object's visual salience from the driver's point of view.

16. The system of claim 9, wherein determining the situational awareness score includes weighing and aggregating gaze point-based features, human visual sensory dependent features, object spatial-based features, object property-based features, and human short-term memory-based features to calculate the situational awareness score for each of the objects, wherein each of the objects is ranked based on the situational awareness score for each of the objects.

17. A non-transitory computer readable storage medium storing instructions that when executed by a computer, which includes a processor perform a method, the method comprising:

receiving data associated with a driving scene of a vehicle and an eye gaze of a driver of the vehicle;

analyzing the data to determine gaze point values that are associated with a foveal and peripheral eye gaze of the driver and extracting features associated with objects located within the driving scene;

determining a situational awareness score that is associated with a situational awareness of the driver with respect to each of the objects located within the driving scene, wherein the situational awareness score is based on a duration and proximity of the eye gaze with respect to each of the objects; and communicating control signals to electronically control at least one system of the vehicle based on the situational awareness score that is associated with each of the objects located within the driving scene, wherein determining the situational awareness score includes analyzing a short-term memory of the driver as an indicator of the situational awareness with respect to each object, wherein the short-term memory is associated with a memory of salient objects versus non-salient objects within the driving scene and a memory score is calculated for each object.

18. The non-transitory computer readable storage medium of claim 17, wherein determining the situational awareness score includes weighing and aggregating gaze point-based features, human visual sensory dependent features, object spatial-based features, object property-based features, and human short-term memory-based features to calculate the situational awareness score for each of the objects, wherein each of the objects is ranked based on the situational awareness score for each of the objects.

* * * * *